United States Patent
Jeon et al.

(10) Patent No.: US 10,457,261 B2
(45) Date of Patent: Oct. 29, 2019

(54) ELECTRONIC BRAKE SYSTEM

(71) Applicant: MANDO CORPORATION, Gyeonggi-do (KR)

(72) Inventors: In Wook Jeon, Seoul (KR); Seong Ho Choi, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/986,810

(22) Filed: May 23, 2018

(65) Prior Publication Data

US 2018/0339689 A1 Nov. 29, 2018

(30) Foreign Application Priority Data

May 23, 2017 (KR) .......................... 10-2017-0063368

(51) Int. Cl.
*B60T 13/68* (2006.01)
*B60T 7/04* (2006.01)
(Continued)

(52) U.S. Cl.
CPC ............ *B60T 13/686* (2013.01); *B60T 7/042* (2013.01); *B60T 8/00* (2013.01); *B60T 8/17* (2013.01);
(Continued)

(58) Field of Classification Search
CPC .......... B60T 7/042; B60T 8/171; B60T 17/22; B60T 17/221; B60T 13/58; B60T 13/142; B60T 13/662; B60T 13/686; B60T 13/745
(Continued)

(56) References Cited

U.S. PATENT DOCUMENTS

| | | | | |
|---|---|---|---|---|
| 2,018,033 A | * | 10/1935 | Rickerd | B65D 47/28 222/559 |
| 10,071,717 B2 | * | 9/2018 | Kim | B60T 7/042 |
| 10,077,036 B2 | * | 9/2018 | Kim | B60T 7/042 |
| 10,166,959 B2 | * | 1/2019 | Jeong | B60T 8/90 |

(Continued)

FOREIGN PATENT DOCUMENTS

EP  2 520 473  11/2012

*Primary Examiner* — Christopher P Schwartz
(74) *Attorney, Agent, or Firm* — Ladas & Parry, LLP

(57) ABSTRACT

An electronic brake system is disclosed. The electronic brake system includes: a hydraulic pressure supply apparatus having a piston operated by an electrical signal corresponding to a displacement of a brake pedal and first and second pressure chambers provided at one side of the piston to be connected to one or more wheel cylinders so as to generate a hydraulic pressure; a first hydraulic passage communicating with the first pressure chamber; second and third hydraulic passages branched from the first hydraulic passage; a fourth hydraulic passage communicating with the second pressure chamber; a fifth hydraulic passage branched from the fourth hydraulic passage to join with the second hydraulic passage; a sixth hydraulic passage branched from the fourth hydraulic passage to join with the third hydraulic passage; a first control valve provided on the second hydraulic passage to control the flow of oil; a second control valve provided on the third hydraulic passage to control the flow of oil; a third control valve provided on the fifth hydraulic passage to control the flow of oil; a fourth control valve provided on the sixth hydraulic passage to control the flow of oil; a first hydraulic circuit configured such that the second hydraulic passage or the fifth hydraulic passage is connected to two wheel cylinders, respectively; and a second hydraulic circuit configured such that the third hydraulic passage or the sixth hydraulic passage is connected to two wheel cylinders, respectively, wherein the first control valve to the fourth control valve are provided as check valves.

11 Claims, 5 Drawing Sheets

(51) Int. Cl.
  *B60T 13/14* (2006.01)
  *B60T 13/74* (2006.01)
  *B60T 8/00* (2006.01)
  *B60T 8/17* (2006.01)
  *B60T 13/66* (2006.01)
  *B60T 8/40* (2006.01)

(52) U.S. Cl.
  CPC .......... *B60T 8/4081* (2013.01); *B60T 13/142* (2013.01); *B60T 13/146* (2013.01); *B60T 13/662* (2013.01); *B60T 13/745* (2013.01); *B60T 2220/04* (2013.01); *B60T 2270/82* (2013.01)

(58) Field of Classification Search
  USPC ....................... 303/3, 15, 113.1–113.5, 114.1
  See application file for complete search history.

(56) References Cited

U.S. PATENT DOCUMENTS

| | | | |
|---|---|---|---|
| 10,173,659 B2* | 1/2019 | Kim | B60T 13/146 |
| 2016/0159331 A1* | 6/2016 | Yang | B60T 13/142 303/15 |
| 2016/0159332 A1* | 6/2016 | Yang | B60T 13/142 303/15 |
| 2016/0214591 A1* | 7/2016 | Yang | B60T 13/686 |
| 2016/0221560 A1* | 8/2016 | Yang | B60T 13/686 |
| 2018/0304872 A1* | 10/2018 | Kim | B60T 7/042 |
| 2018/0339690 A1* | 11/2018 | Kim | B60T 13/745 |
| 2018/0339692 A1* | 11/2018 | Jeong | B60T 8/4081 |
| 2019/0092302 A1* | 3/2019 | Jeong | B60L 7/18 |
| 2019/0100179 A1* | 4/2019 | Lee | B60T 8/4081 |
| 2019/0100183 A1* | 4/2019 | Jung | B60T 13/58 |
| 2019/0100186 A1* | 4/2019 | Jeong | B60T 8/4081 |
| 2019/0100187 A1* | 4/2019 | Jeong | B60T 7/042 |

* cited by examiner

[Fig 1]
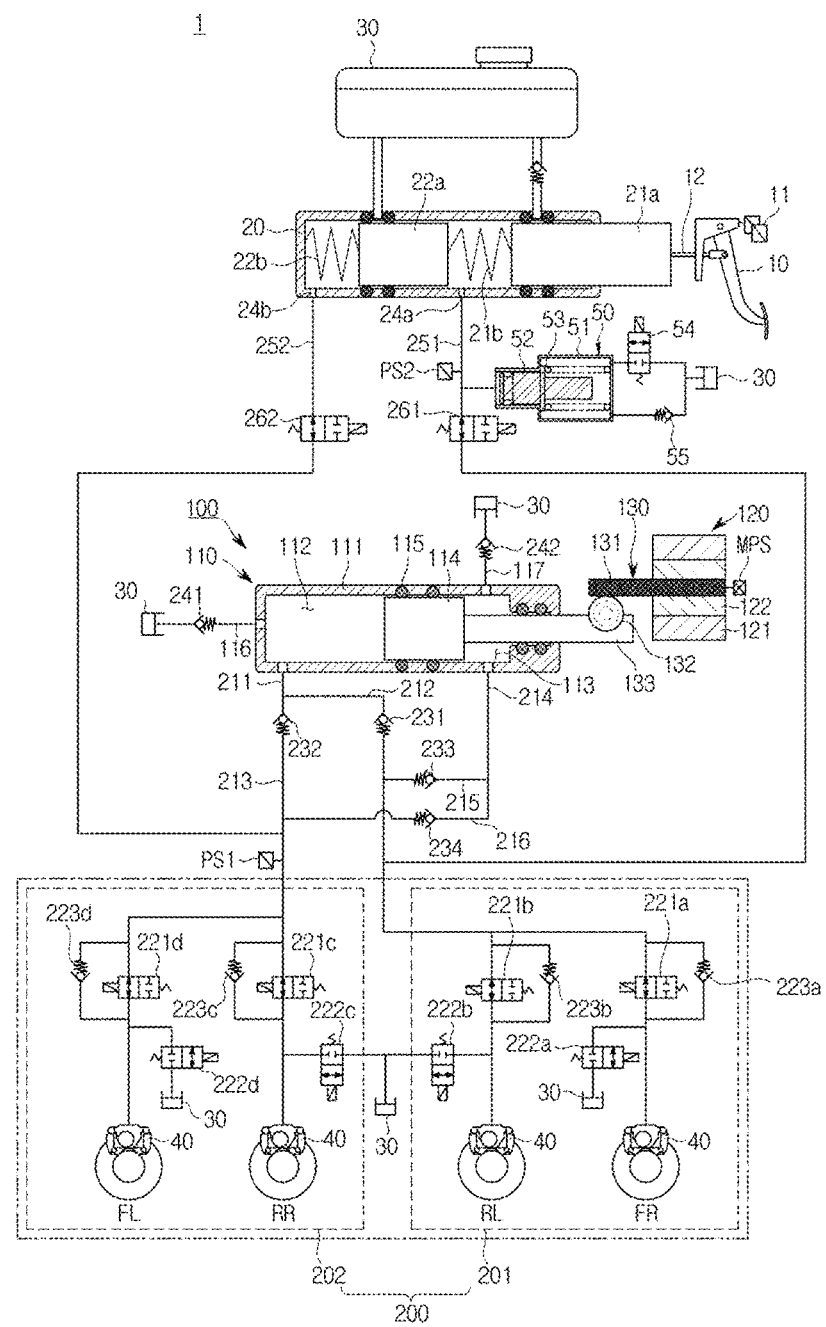

[Fig 2]
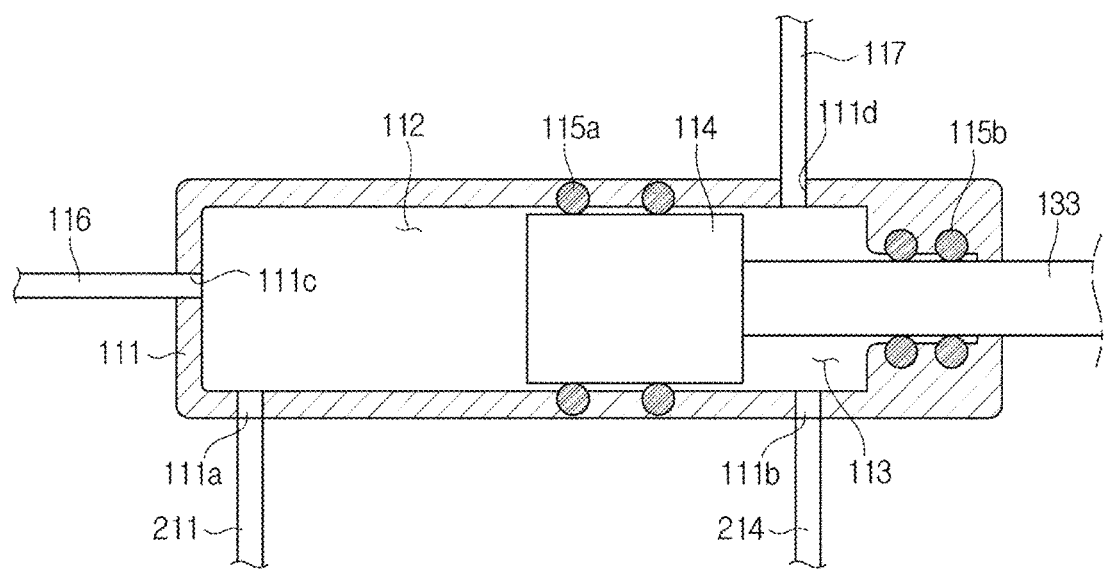

[Fig 3]
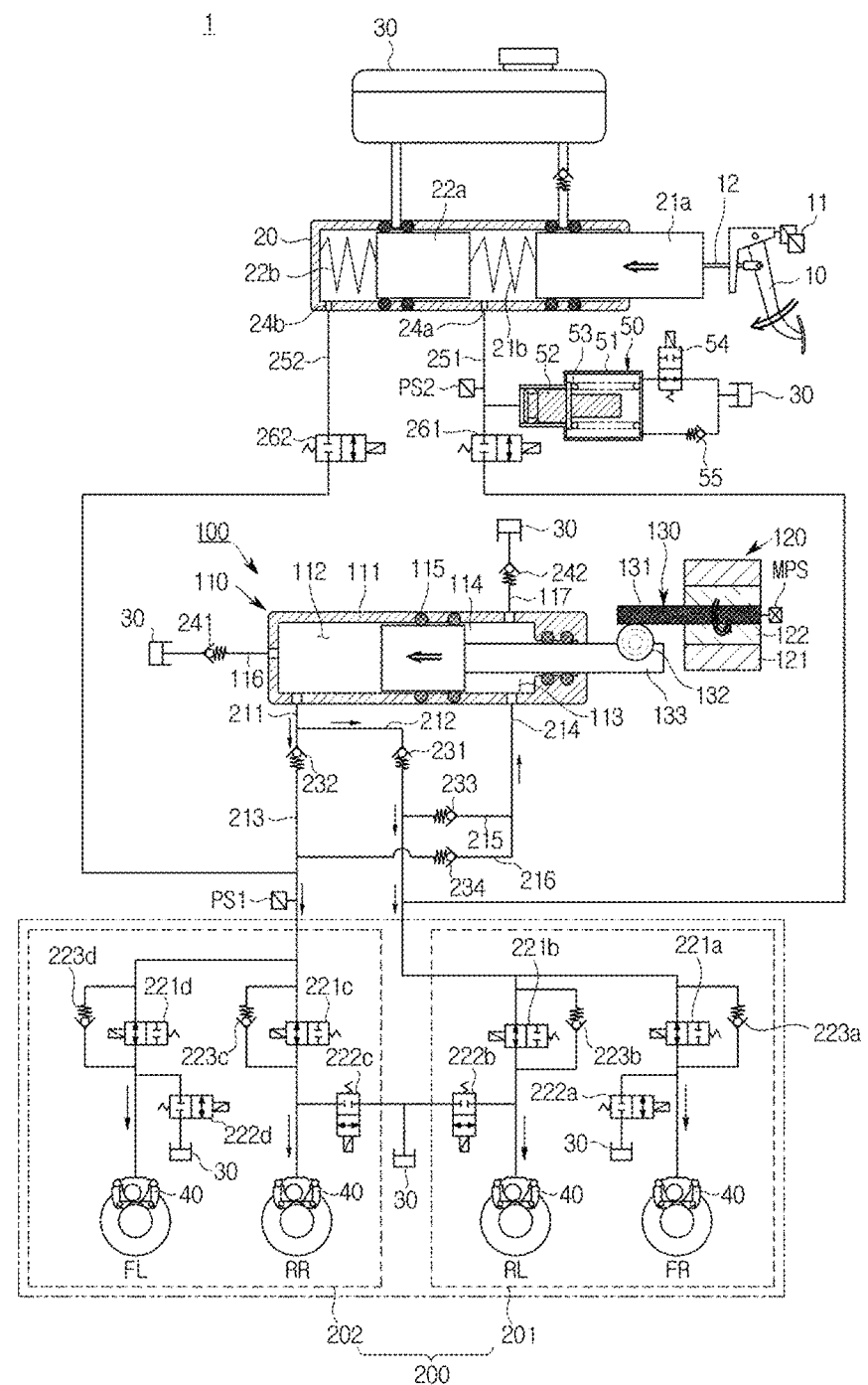

【Fig 4】
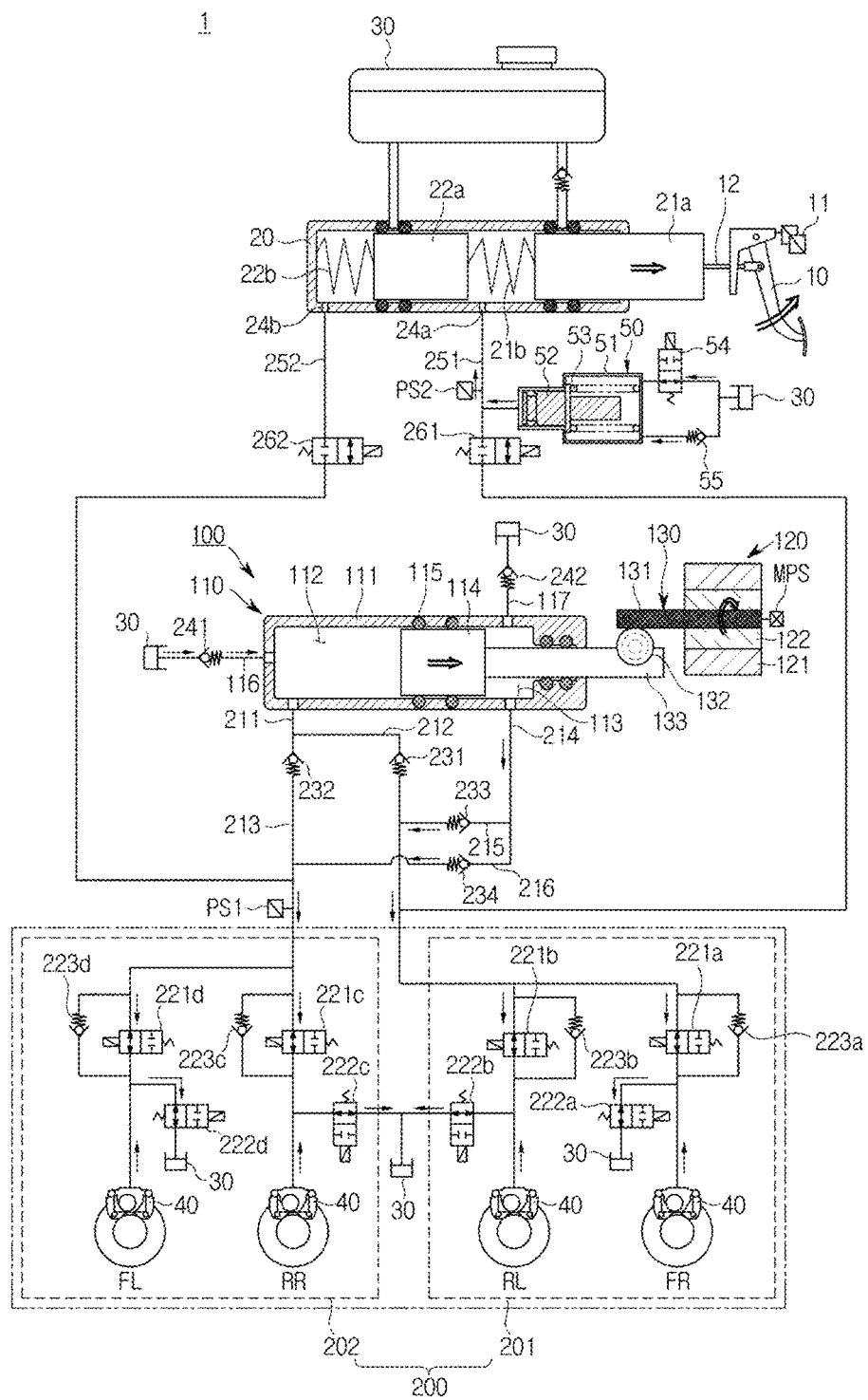

[Fig 5]
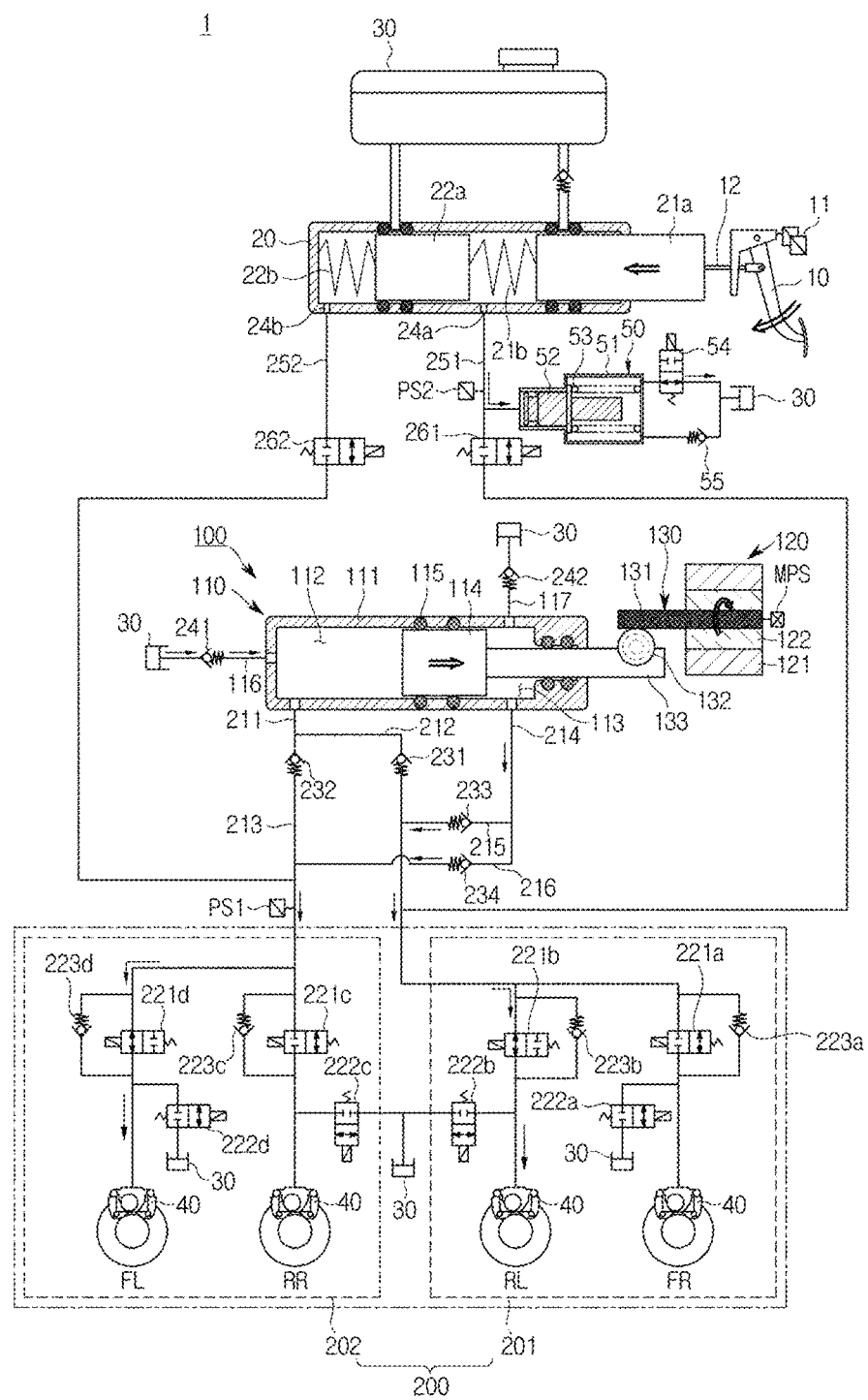

ELECTRONIC BRAKE SYSTEM

CROSS-REFERENCE TO RELATED APPLICATION(S)

This application is based on and claims priority under 35 U.S.C. § 119 to Korean Patent Application No. 10-2017-0063368, filed on May 23, 2017 in the Korean Intellectual Property Office, the disclosure of which is incorporated by reference herein in its entirety.

BACKGROUND

1. Technical Field

The present disclosure relates to an electronic brake system, and more particularly, to an electronic brake system that generates a braking force by using an electrical signal corresponding to a displacement of a brake pedal.

2. Description of the Related Art

A vehicle is essentially equipped with a brake system for braking. Recently, various types of systems have been proposed for obtaining a more powerful and stable braking force.

Examples of the brake system include an anti-lock brake system (ABS) that prevents slippage of wheels during braking, a brake traction control system (BTCS) that prevents slippage of drive wheels during a sudden acceleration or a rapid acceleration, and an electronic stability control system (ESC) that stably maintains the running state of a vehicle by controlling the brake fluid pressure by combining the anti-lock brake system and the traction control.

In general, the electronic brake system includes a hydraulic pressure supply apparatus that receives an electric signal of a driver's braking will from a pedal displacement sensor that senses a displacement of a brake pedal when the driver depresses the brake pedal, and supplies pressure to wheel cylinders.

An electronic brake system equipped with the hydraulic pressure supply apparatus as above is disclosed in European Patent EP 2 520 473. According to the disclosed document, a hydraulic pressure supply apparatus is operated so that a motor operates according to a pedal effort of a brake pedal to generate braking pressure. At this time, the braking pressure is generated by converting the rotational force of the motor into linear motion and pressing a piston.

SUMMARY

It is an aspect of the present disclosure to provide an electronic brake system including a hydraulic pressure supply apparatus that operates in a double acting manner.

Additional aspects of the present disclosure will be set forth in part in the description which follows and, in part, will be obvious from the description, or may be learned by practice of the disclosure.

In accordance with one aspect of the present disclosure, there may be provided an electronic brake system comprising: a hydraulic pressure supply apparatus which generates a hydraulic pressure by using a piston operated by an electrical signal output corresponding to a displacement of a brake pedal, and includes a first pressure chamber provided at one side of a piston movably accommodated in a cylinder block to be connected to one or more wheel cylinders and a second pressure chamber provided at the other side of the piston to be connected to the one or more wheel cylinders; a first hydraulic passage communicating with the first pressure chamber; a second hydraulic passage branched from the first hydraulic passage; a third hydraulic passage branched from the first hydraulic passage; a fourth hydraulic passage communicating with the second pressure chamber; a fifth hydraulic passage branched from the fourth hydraulic passage to join with the second hydraulic passage; a sixth hydraulic passage branched from the fourth hydraulic passage to join with the third hydraulic passage; a first control valve provided on the second hydraulic passage to control the flow of oil; a second control valve provided on the third hydraulic passage to control the flow of oil; a third control valve provided on the fifth hydraulic passage to control the flow of oil; a fourth control valve provided on the sixth hydraulic passage to control the flow of oil; a first hydraulic circuit configured such that the second hydraulic passage or the fifth hydraulic passage is connected to two wheel cylinders, respectively; and a second hydraulic circuit configured such that the third hydraulic passage or the sixth hydraulic passage is connected to two wheel cylinders, respectively, wherein the first control valve to the fourth control valve are provided as check valves that allow the flow of oil in the direction from the hydraulic pressure supply apparatus to the wheel cylinders and blocks the flow of oil in the opposite direction.

Further, the first control valve may be installed on the second hydraulic passage between a point where the second hydraulic passage and the third hydraulic passage are branched from the first hydraulic passage and a point where the fifth hydraulic passage joins with the second hydraulic passage.

Further, the second control valve may be installed on the third hydraulic passage between a point where the second hydraulic passage and the third hydraulic passage are branched from the first hydraulic passage and a point where the sixth hydraulic passage joins with the third hydraulic passage.

Further, the third control valve may be installed on the fifth hydraulic passage between a point where the fifth hydraulic passage and the sixth hydraulic passage are branched from the fourth hydraulic passage and a point where the second hydraulic passage joins with the fifth hydraulic passage.

Further, the fourth control valve may be installed on the sixth hydraulic passage between a point where the fifth hydraulic passage and the sixth hydraulic passage are branched from the fourth hydraulic passage and a point where the third hydraulic passage joins with the sixth hydraulic passage.

Further, the electronic brake system may further comprise a reservoir in which oil is stored, a first dump passage communicating with the first pressure chamber to be connected to the reservoir, a second dump passage communicating with the second pressure chamber to be connected to the reservoir, a first dump valve provided on the first dump passage to control the flow of oil and provided as a check valve for blocking the flow of oil in the opposite direction while allowing the flow of oil in the direction from the reservoir to the first pressure chamber, and a second dump valve provided on the second dump passage to control the flow of oil and provided as a check valve for blocking the flow of oil in the opposite direction while allowing the flow of oil in the direction from the reservoir to the second pressure chamber.

Further, the hydraulic pressure supply apparatus may further include the cylinder block, the piston movably accommodated in the cylinder block and moving backward and forward by the rotational force of a motor, a first communication hole formed at the cylinder block forming the first pressure chamber to communicate with the first hydraulic passage, and a second communication hole formed at the cylinder block forming the second pressure chamber to communicate with the fourth hydraulic passage.

Further, when a hydraulic pressure is generated in the first pressure chamber while the piston moves forward, the first control valve and the second control valve may transmit the hydraulic pressure in the first pressure chamber to the wheel cylinders, and the third control valve and the fourth control valve may block the hydraulic pressure in the first pressure chamber from being transmitted to the wheel cylinders.

Further, the electronic brake system may further comprise a reservoir in which oil is stored, a second dump passage communicating with the second pressure chamber to be connected to the reservoir, and a second dump valve provided on the second dump passage to control the flow of oil and provided as a check valve for blocking the flow of oil in the opposite direction while allowing the flow of oil in the direction from the reservoir to the second pressure chamber.

Further, when a hydraulic pressure is generated in the second pressure chamber while the piston moves backward, the third control valve and the fourth control valve may transmit the hydraulic pressure in the second pressure chamber to the wheel cylinders, and the first control valve and the second control valve may block the hydraulic pressure in the second pressure chamber from being transmitted to the wheel cylinders.

Further, the electronic brake system may further comprise a reservoir in which oil is stored, a first dump passage communicating with the first pressure chamber to be connected to the reservoir, and a first dump valve provided on the first dump passage to control the flow of oil and provided as a check valve for blocking the flow of oil in the opposite direction while allowing the flow of oil in the direction from the reservoir to the first pressure chamber.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a hydraulic circuit diagram showing a non-braking state of an electronic brake system according to an embodiment of the present disclosure;

FIG. 2 is an enlarged view showing a hydraulic pressure providing unit of an electronic brake system according to an embodiment of the present disclosure;

FIG. 3 is a hydraulic circuit diagram showing a situation in which a hydraulic piston of an electronic brake system according to an embodiment of the present disclosure provides a braking pressure while advancing;

FIG. 4 is a hydraulic circuit diagram showing a situation in which a hydraulic piston of an electronic brake system according to an embodiment of the present disclosure releases a braking pressure while reversing; and FIG. 5 is a hydraulic circuit diagram showing a state in which an electronic brake system according to an embodiment of the present disclosure is operated in the ABS mode and a hydraulic piston brakes selectively while reversing.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration. Like reference numerals designate like elements throughout the specification.

FIG. 1 is a hydraulic circuit diagram showing a non-braking state of an electronic brake system according to an embodiment of the present disclosure.

Referring to FIG. 1, an electronic brake system 1 typically includes a master cylinder 20 for generating a hydraulic pressure, a reservoir 30 coupled to an upper portion of the master cylinder 20 to store oil, an input rod 12 for pressing the master cylinder 20 in accordance with a pedal effort of the brake pedal 10, wheel cylinders 40 that receive the hydraulic pressure and perform the braking of respective wheels RR, RL, FR and FL, a pedal displacement sensor 11 for sensing a displacement of the brake pedal 10, and a simulation apparatus 50 for providing a reaction force in accordance with the pedal effort of the brake pedal 10.

The master cylinder 20 may be configured to include at least one chamber to generate hydraulic pressure. As an example, in the present embodiment, the master cylinder 20 is configured to have two chambers, and each chamber is provided with a first piston 21a and a second piston 22a. The first piston 21a may be connected to the input rod 12, and the master cylinder 20 may have first and second hydraulic pressure ports 24a and 24b, respectively, through which hydraulic pressure is discharged from the two chambers.

The master cylinder 20 may ensure safety in case of failure by having the two chambers. For example, one chamber of the two chambers may be connected to the front right wheel FR and the rear left wheel RL of a vehicle, and the other chamber may be connected to the front left wheel FL and the rear right wheel RR. In this way, by independently configuring the two chambers, it is possible to brake the vehicle even if one of the master chambers fails.

Alternatively, unlike the drawing, one of the two chambers may be connected to the two front wheels FR and FL, and the other chamber may be connected to the two rear wheels RR and RL. In addition, one of the two chambers may be connected to the front left wheel FL and the rear left wheel RL, and the other chamber may be connected to the rear right wheel RR and the front right wheel FR. That is, the positions of the wheels connected to the chambers of the master cylinder may be variously configured.

A first spring 21b may be provided between the first piston 21a and the second piston 22a of the master cylinder 20, and a second spring 22b may be provided between the second piston 22a and an end of the master cylinder 20.

The first spring 21b and the second spring 22b are provided in the two chambers, respectively. As the displacement of the brake pedal 10 changes, the first piston 21a and the second piston 22a are compressed, and thus the elastic force is stored in the first spring 21b and the second spring 22b. When a force pushing the pistons becomes smaller than the elastic force of the spring, the first and second pistons 21a and 22a may be pushed to return to their original positions by using the elastic force stored in the first spring 21b and the second spring 22b.

The input rod 12 for pressing the first piston 21a of the master cylinder 20 may be brought into close contact with the first piston 21a. That is, a gap between the master cylinder 20 and the input rod 12 may not exist. Therefore, when the brake pedal 10 is depressed, the master cylinder 20 may be directly pressed without a pedal invalid stroke section.

The simulation apparatus 50 may be connected to a first backup passage 251, which will be described later, to provide a reaction force in accordance with the pedal effort of the brake pedal 10. The reaction force is provided as much as compensating a driver's pedal effort so that the driver may precisely regulate the braking force as intended.

As shown in FIG. 1, the simulation apparatus 50 includes a pedal simulator that has a simulation chamber 51 provided to store the oil flowing out from the first hydraulic pressure port 24a of the master cylinder 20, a pedal simulator having a reaction force piston 52 provided in a simulation chamber 51 and a reaction force spring 53 elastically supporting the reaction force piston 52, and a simulator valve 54 connected to a rear portion of the simulation chamber 51.

The reaction force piston 52 and the reaction force spring 53 are installed so as to have a certain range of displacement in the simulation chamber 51 by the oil introduced into the simulation chamber 51.

The reaction force spring 53 shown in the drawing is only one embodiment capable of providing an elastic force to the reaction force piston 52 and may include various embodiments capable of storing the elastic force by deforming the shape. For example, it includes various members capable of storing an elastic force by being made of a material such as rubber or having a coil or a plate shape.

The simulator valve 54 may be provided on a flow passage connecting a rear end of the simulation chamber 51 and the reservoir 30. A front end of the simulation chamber 51 may be connected to the master cylinder 20, and the rear end of the simulation chamber 51 may be connected to the reservoir 30 through the simulator valve 54. Accordingly, even when the reaction force piston 52 returns, oil in the reservoir 30 flows through the simulator valve 54, so that the entire interior of the simulation chamber 51 may be filled with the oil.

In the drawing, the plurality of reservoirs 30 are shown, and each reservoir is denoted by the same reference numeral. However, these reservoirs may be provided with the same parts or may be provided with different parts. For example, the reservoir 30 connected to the simulation apparatus 50 may be the same as the reservoir 30 connected to the master cylinder 20 or may be a reservoir capable of storing oil separately from the reservoir 30 connected to the master cylinder 20.

The simulator valve 54 may be composed of a normally closed type solenoid valve (NC valve) that is normally kept closed. The simulator valve 54 may be opened when a driver presses the brake pedal 10 to deliver the oil in the simulation chamber 51 to the reservoir 30.

Further, a simulator check valve 55 may be provided between the pedal simulator and the reservoir 30 in parallel with the simulator valve 54. The simulator check valve 55 may allow the oil in the reservoir 30 to flow into the simulation chamber 51, but may block the oil in the simulation chamber 51 from flowing to the reservoir 30 through a flow passage on which the simulator check valve 55 is installed. A quick return of the pedal simulator pressure may be ensured since oil may be supplied into the simulation chamber 51 through the simulator check valve 55 when the brake pedal 10 is released.

The operation of the pedal simulation apparatus 50 is as follows. When a driver depresses the brake pedal 10, the oil in the simulation chamber 51 is transmitted to the reservoir 30 through the simulator valve 54 as the reaction force piston 52 of the pedal simulator pushes the reaction force spring 53, and the driver is provided with a sense of pedaling in this process. On the contrary, when the driver releases the pedal effort applied to the brake pedal 10, the reaction force spring 53 pushes the reaction force piston 52 to be returned to the original state, and the oil in the reservoir 30 may flow into the simulation chamber 51, through the flow passage on which the simulator valve 54 is provided and the flow passage on which the check valve 55 is provided, to fill oil in the inside of the simulation chamber 51.

As such, since the inside of the simulation chamber 51 is always filled with oil, the friction of the reaction force piston 52 is minimized during operation of the simulation apparatus 50 so that the durability of the simulation apparatus 50 is improved and the inflow of foreign matter from the outside is blocked.

The electronic brake system 1 according to an embodiment of the present disclosure may include a hydraulic pressure supply apparatus 100 which mechanically operates by receiving an electric signal of a driver's braking will from the pedal displacement sensor 11 which detects a displacement of the brake pedal 10, a hydraulic control unit 200 composed of the first and second hydraulic circuits 201 and 202 for controlling the flow of hydraulic pressure transmitted to the wheel cylinders 40 provided on the two wheels FR and RL or FL and RR, a first cut valve 261 provided on the first backup passage 251 that connects the first hydraulic pressure port 24a and the first hydraulic circuit 201 to control the flow of hydraulic pressure, a second cut valve 262 provided on a second backup passage 252 that connects the second hydraulic pressure port 24b and the second hydraulic circuit 202 to control the flow of hydraulic pressure, and an electronic control unit (ECU; not shown) for controlling the hydraulic pressure supply apparatus 100 and valves 54, 221a, 221b, 221c, 221d, 222a, 222b, 222c and 222d based on hydraulic pressure information and pedal displacement information.

The hydraulic pressure supply apparatus 100 may include the hydraulic pressure providing unit 110 for providing oil pressure delivered to the wheel cylinders 40, a motor 120 for generating a rotational force by an electrical signal of the pedal displacement sensor 11, and a power converting unit 130 for converting the rotational motion of the motor 120 into a linear motion and transmitting the linear motion to the hydraulic pressure providing unit 110. The hydraulic pressure providing unit 110 may be operated by the pressure supplied from a high pressure accumulator, not by the driving force supplied from the motor 120.

Next, the hydraulic pressure providing unit 110 according to an embodiment of the present disclosure will be described with reference to FIG. 2. FIG. 2 is an enlarged view showing the hydraulic pressure providing unit 110 according to an embodiment of the present disclosure.

The hydraulic pressure providing unit 110 includes a cylinder block 111 in which a pressure chamber for receiving and storing oil is formed, a hydraulic piston 114 accommodated in the cylinder block 111, sealing members 115 (115a, 115b) provided between the hydraulic piston 114 and the cylinder block 111 to seal pressure chambers, and a drive shaft 133 connected to the rear end of the hydraulic piston 114 to transmit the power output from the power converting unit 130 to the hydraulic piston 114.

The pressure chambers may include a first pressure chamber 112 positioned forward (forward direction, leftward direction in the drawing) of the hydraulic piston 114 and a second pressure chamber 113 positioned rearward (rearward direction, rightward in the drawing) of the hydraulic piston 114. That is, the first pressure chamber 112 is partitioned by the cylinder block 111 and the front end of the hydraulic piston 114 and is provided such that the volume thereof changes according to the movement of the hydraulic piston 114, and the second pressure chamber 113 is partitioned by the cylinder block 111 and the rear end of the hydraulic piston 114 and is provided such that the volume thereof changes according to the movement of the hydraulic piston 114.

The first pressure chamber 112 is connected to a first hydraulic passage 211 through a first communication hole 111a formed at the rear side of the cylinder block 111 and is connected to a fourth hydraulic passage 214 through a second communication hole 111b formed at the front side of the cylinder block 111. The first hydraulic passage 211 connects the first pressure chamber 112 and the first and second hydraulic circuits 201 and 202. In addition, the first hydraulic passage 211 is branched into a second hydraulic passage 212 communicating with the first hydraulic circuit 201 and a third hydraulic passage 213 communicating with the second hydraulic circuit 202. The fourth hydraulic passage 214 connects the second pressure chamber 113 and the first and second hydraulic circuits 201 and 202. In addition, the fourth hydraulic passage 214 is branched into a fifth hydraulic passage 215 communicating with the first hydraulic circuit 201 and a sixth hydraulic passage 216 communicating with the second hydraulic circuit 202.

The sealing members 115 include a piston sealing member 115a provided between the hydraulic piston 114 and the cylinder block 111 to seal a gap between the first pressure chamber 112 and the second pressure chamber 113, and a drive shaft sealing member 115b provided between the drive shaft 133 and the cylinder block 111 to seal a gap between the second pressure chamber 113 and of the cylinder block 111. That is, the hydraulic pressure or the negative pressure of the first pressure chamber 112 generated by the forward or backward movement of the hydraulic piston 114 may not be leaked to the second pressure chamber 113 by blocking by the piston sealing member 115a, and may be transmitted to the first and fourth hydraulic passages 211 and 214. In addition, the hydraulic pressure or the negative pressure of the second pressure chamber 113 generated by the forward or backward movement of the hydraulic piston 114 may not be leaked to the cylinder block 111 by blocking by the drive shaft sealing member 115b.

The first and second pressure chambers 112 and 113 are connected to the reservoir 30 by dump passages 116 and 117, respectively, so that the first and second pressure chambers 112 and 113 may receive and store oil from the reservoir 30, or the oil in the first pressure chamber 112 or the second pressure chamber 113 may be delivered to the reservoir 30. For example, the dump passages 116 and 117 may include the first dump passage 116 branched from the first pressure chamber 112 and connected to the reservoir 30, and the second dump passage 117 branched from the second pressure chamber 113 and connected to the reservoir 30, respectively.

Further, a first communication hole 111a communicating with the first hydraulic passage 211 may be formed at a front of the first pressure chamber 112 and a second communication hole 111a communicating with the fourth hydraulic passage 214 may be formed at a rear of the first pressure chamber 112. A third communication hole 111c communicating with the first dump passage 116 may be further formed in the first pressure chamber 112, and a fourth communication hole 111d communicating with the second dump passage 117 may be formed in the second pressure chamber 113.

Flow passages 211 to 216 and valves 231 to 234, which are connected to the first pressure chamber 112 and the second pressure chamber 113, will be described below with reference to FIG. 1.

The first hydraulic passage 211 may be branched into the second hydraulic passage 212 and the third hydraulic passage 213 to communicate with both the first hydraulic circuit 201 and the second hydraulic circuit 202. For example, the second hydraulic passage 212 may communicate with the first hydraulic circuit 201, and the third hydraulic passage 213 may communicate with the second hydraulic circuit 202. Accordingly, the hydraulic pressure may be transmitted to the first hydraulic circuit 201 and the second hydraulic circuit 202 by the forward movement of the hydraulic piston 114.

Further, the electronic brake system 1 according to an embodiment of the present disclosure may include a first control valve 231 and a second control valve 232 provided on the second and third hydraulic passages 212 and 213, respectively, to control the flow of oil.

The first and second control valves 231 and 232 may be provided as check valves that allow only the oil flow in the direction from the first pressure chamber 112 to the first or second hydraulic circuit 201 or 202 and block the oil flow in the opposite direction. That is, the first or second control valve 231 or 232 may allow the hydraulic pressure in the first pressure chamber 112 to be transmitted to the first or second hydraulic circuit 201 or 202, but may prevent the hydraulic pressure in the first or second hydraulic circuit 201 or 202 from being leaked to the first pressure chamber 112 through the second or third hydraulic passage 212 or 213.

The fourth hydraulic passage 214 may be branched into the fifth hydraulic passage 215 and the sixth hydraulic passage 216 to communicate with both the first hydraulic circuit 201 and the second hydraulic circuit 202. For example, the fifth hydraulic passage 215 branched from the fourth hydraulic passage 214 may communicate with the first hydraulic circuit 201, and the sixth hydraulic passage 216 branched from the fourth hydraulic passage 214 may communicate with the second hydraulic circuit 202. Accordingly, the hydraulic pressure may be transmitted to both the first hydraulic circuit 201 and the second hydraulic circuit 202 by the backward movement of the hydraulic piston 114.

Further, the electronic brake system 1 according to an embodiment of the present disclosure may include a third control valve 233 provided on the fifth hydraulic passage 215 to control the flow of oil, and a fourth control valve 234 provided on the sixth hydraulic passage 216 to control the flow of oil.

The third and fourth control valves 233 and 234 may be provided as check valves that allow only the oil flow in the direction from the second pressure chamber 113 to the first or second hydraulic circuit 201 or 202 and block the oil flow in the opposite direction. That is, the third or fourth control valve 233 or 234 may allow the hydraulic pressure of the second pressure chamber 113 to be transmitted to the first or second hydraulic circuit 201 or 202, but may prevent the hydraulic pressure of the first or second hydraulic circuit 201 or 202 from being leaked to the second pressure chamber 113 through the fifth or sixth hydraulic passage 215 or 216.

Further, the electronic brake system 1 according to an embodiment of the present disclosure may further include a first dump valve 241 and a second dump valve 242 provided on the first dump passage 116 and the second dump passage 117, respectively, to control the flow of oil. The first and second dump valves 241 and 242 may be check valves that is opened only in the direction from the reservoir 30 to the first or second pressure chamber 112 or 113 and closed in the opposite direction. That is, the first dump valve 241 may be a check valve that allows the oil to flow from the reservoir 30 to the first pressure chamber 112 while blocking the flow of oil from the first pressure chamber 112 to the reservoir 30, and the second dump valve 242 may be a check valve that allows the oil to flow from the reservoir 30 to the second pressure chamber 113 while blocking the flow of oil from the second pressure chamber 113 to the reservoir 30. The first dump valve 241 and the second dump valve 242 may supply the oil in the reservoir 30 to the first pressure chamber 112 and the second pressure chamber 113 when the first and second pressure chambers 112 and 113 are in a negative pressure state.

The hydraulic pressure providing unit 110 of the electronic brake system 1 according to an embodiment of the present disclosure may operate in a double acting manner.

That is, the hydraulic pressure generated in the first pressure chamber 112 as the hydraulic piston 114 advances is transmitted to the first hydraulic circuit 201 through the first hydraulic passage 211 and the second hydraulic passage 212 to operate the wheel cylinders 40 installed on the front right wheel FR and the rear left wheel RL, and is transmitted to the second hydraulic circuit 202 through the first hydraulic passage 211 and the third hydraulic passage 213 to operate the wheel cylinders 40 installed on the rear right wheel RR and the front left wheel FL.

Likewise, the hydraulic pressure generated in the second pressure chamber 113 as the hydraulic piston 114 moves backward is transmitted to the first hydraulic circuit 201 through the fourth hydraulic passage 214 and the fifth hydraulic passage 215 to operate the wheel cylinders 40 installed on the front light wheel FR and the rear left wheel RL, and is transmitted to the second hydraulic circuit 202 through the fourth hydraulic passage 214 and the sixth hydraulic passage 216 to operate the wheel cylinders 40 installed on the rear right wheel RR and the front left wheel FL.

Next, the motor 120 and the power converting unit 130 of the hydraulic pressure supply apparatus 100 will be described.

The motor 120 which is a device for generating a rotational force by a signal output from an electronic control unit (ECU) (not shown) may include a stator 121 and a rotor 122 to generate a rotational force in a forward or reverse direction. The rotational angular velocity and rotation angle of the motor 120 may be precisely controlled. Since the motor 120 is a well-known technology, a detailed description thereof will be omitted.

The electronic control unit controls the valves 54, 221a, 221b, 221c, 221d, 222a, 222b, 222c, 222d, 261 and 262 included in the electronic brake system 1 of the present disclosure, including the motor 120, which will be described later. The operation in which a plurality of valves is controlled according to the displacement of the brake pedal 10 will be described later.

The driving force of the motor 120 causes the displacement of the hydraulic piston 114 through the power converting unit 130, and the hydraulic pressure generated by the sliding movement of the hydraulic piston 114 in the pressure chambers is transmitted to the wheel cylinders 40 installed on the respective wheels RR, RL, FR and FL through the first and second hydraulic passages 211 and 212.

The power converting unit 130 which is a device for converting a rotational force into a linear motion may include a worm shaft 131, a worm wheel 132, and the drive shaft 133, for example.

The worm shaft 131 may be integrally formed with a rotation shaft of the motor 120, and rotates the worm wheel 132 by forming a worm that engages with the worm wheel 132 on the outer circumferential surface thereof. The worm wheel 132 is coupled to be engaged with the drive shaft 133 to move the drive shaft 133 linearly, and the drive shaft 133 is connected to the hydraulic piston 114 to slide the hydraulic piston 114 in the cylinder block 111.

The above operations may be described again as follows. A signal sensed by the pedal displacement sensor 11 as a displacement occurs in the brake pedal 10 is transmitted to the electronic control unit (ECU) (not shown), and the electronic control unit drives the motor 120 in one direction to rotate the worm shaft 131 in one direction. The rotational force of the worm shaft 131 is transmitted to the drive shaft 133 via the worm wheel 132, and the hydraulic piston 114 connected to the drive shaft 133 moves forward to generate a hydraulic pressure to the first pressure chamber 112.

On the contrary, when the pedal effort on the brake pedal 10 is released, the electronic control unit drives the motor 120 in the opposite direction to rotate the worm shaft 131 in the opposite direction. Accordingly, the worm wheel 132 also rotates in the opposite direction and the hydraulic piston 114 connected to the drive shaft 133 returns (moves backward), thereby generating a negative pressure in the first pressure chamber 112.

On the other hand, the hydraulic pressure and the negative pressure may be generated in a direction opposite to the above.

That is, a signal sensed by the pedal displacement sensor 11 as a displacement occurs in the brake pedal 10 is transmitted to the electronic control unit (ECU) (not shown), and the electronic control unit drives the motor 120 in the opposite direction to rotate the worm shaft 131 in the opposite direction. The rotational force of the worm shaft 131 is transmitted to the drive shaft 133 via the worm wheel 132 and the hydraulic piston 114 connected to the drive shaft 133 moves backward, thereby generating a hydraulic pressure in the second pressure chamber 113.

On the contrary, when the pedal effort on the brake pedal 10 is released, the electronic control unit drives the motor 120 in one direction to rotate the worm shaft 131 in one direction. Accordingly, the worm wheel 132 also rotates in the opposite direction and the hydraulic piston 114 connected to the drive shaft 133 returns (advances), thereby generating a negative pressure in the second pressure chamber 113.

As such, the hydraulic pressure supply apparatus 100 performs the function of transmitting the hydraulic pressure to the wheel cylinders 40 or sucking and transmitting the hydraulic pressure to the reservoir 30 in accordance with the rotational direction of the rotational force generated from the motor 120.

When the motor 120 rotates in one direction, a hydraulic pressure may be generated in the first pressure chamber 112 or a negative pressure may be generated in the second pressure chamber 113. In such a case, whether to brake by using the hydraulic pressure or to release the braking by using the negative pressure may be determined by controlling the valves 54, 221a, 221b, 221c, 221d, 222a, 222b, 222c, 222d. Such a case will be described later in detail.

Although not shown in the drawings, the power converting unit 130 may be constituted by a ball screw nut assembly. The power converting unit 130 may include, for example, a screw integrally formed with the rotation shaft of the motor 120 or connected to rotate together with the rotation shaft of the motor 120, and a ball nut that is screwed with the screw in a limited rotation state and linearly moves according to the rotation of the screw. The hydraulic piston 114 is connected to the ball nut of the power converting unit 130 and presses the pressure chambers by the linear movement of the ball nut. The structure of such a ball screw nut assembly is a known apparatus for converting a rotational motion into a linear motion, and thus a detailed description thereof will be omitted.

It should be understood that the power converting unit 130 according to an embodiment of the present disclosure may adopt any structure other than the structure of the ball screw nut assembly as long as the structure may convert a rotational motion into a linear motion.

Further, the electronic brake system 1 according to an embodiment of the present disclosure may further include the first and second backup passages 251 and 252 capable of directly supplying the oil discharged from the master cylinder 20 to the wheel cylinders 40 when operating abnormally.

The first backup passage 251 may connect the first hydraulic pressure port 24a to the first hydraulic circuit 201, and the second backup passage 252 may connect the second hydraulic pressure port 24b and the second hydraulic circuit 202.

Further, the first cut valve 261 for controlling the flow of oil may be provided on the first backup passage 251 and the second cut valve 262 for controlling the flow of oil may be provided on the second backup passage 252. The first and second cut valves 261 and 262 may be provided as normally open type solenoid valves that are opened in a normal state and operate to be closed when receiving a close signal from the electronic control unit.

Next, the hydraulic control unit 200 according to an embodiment of the present disclosure will be described with reference to FIG. 1.

The hydraulic control unit 200 may include the first hydraulic circuit 201 and the second hydraulic circuit 202, each of which receives hydraulic pressure and controls two wheels, respectively. For example, the first hydraulic circuit 201 may control the front right wheel FR and the rear left wheel RL, and the second hydraulic circuit 202 may control the front left wheel FL and the rear right wheel RR. The wheel cylinders 40 are provided on the respective wheels FR, FL, RR and RL to receive the hydraulic pressure and perform a braking.

The first hydraulic circuit 201 is connected to the first hydraulic passage 211 and the second hydraulic passage 212 and is supplied with the hydraulic pressure from the hydraulic pressure supply apparatus 100, and the second hydraulic passage 212 is branched into two flow passages connected to the front right wheel FR and the rear left wheel RL. Likewise, the second hydraulic circuit 202 is connected to the first hydraulic passage 211 and the third hydraulic passage 213 and is supplied with the hydraulic pressure from the hydraulic pressure supply apparatus 100, and the third hydraulic passage 213 is branched into two flow passages connected to the front left wheel FL and the rear right wheel RR.

The first and second hydraulic circuits 201 and 202 may include a plurality of inlet valves 221 (221a, 221b, 221c, and 221d) to control the flow of hydraulic pressure. For example, the first hydraulic circuit 201 may be provided with the two inlet valves 221a and 221b that are connected to the second hydraulic passage 212 to control the hydraulic pressure transmitted to the two wheel cylinders 40, respectively. Further, the second hydraulic circuit 202 may be provided with the two inlet valves 221c and 221d that are connected to the third hydraulic passage 213 to control the hydraulic pressure transmitted to the two wheel cylinders 40, respectively.

The inlet valves 221 may be provided as normally open type solenoid valves that are disposed on an upstream side of the wheel cylinders 40 and are opened in a normal state and operate to be closed when receiving a close signal from the electronic control unit.

The first and second hydraulic circuits 201 and 202 may include check valves 223a, 223b, 223c and 223d provided on bypass passages that connect the front and the rear of each of the inlet valves 221a, 221b, 221c and 221d. The check valves 223a, 223b, 223c and 223d may be provided to allow only the flow of oil in the direction to the hydraulic pressure providing unit 110 from the wheel cylinders 40 and to limit the flow of oil in the direction to the wheel cylinders 40 from the hydraulic pressure providing unit 110. The check valves 223a, 223b, 223c and 223d may quickly release the braking pressure of the wheel cylinders 40, and may allow the hydraulic pressure of the wheel cylinders 40 to flow into the hydraulic pressure providing unit 110 when the inlet valves 221a, 221b, 221c and 221d are not operated normally.

The first and second hydraulic circuits 201 and 202 may further include a plurality of outlet valves 222 (222a, 222b, 222c and 222d) connected to the reservoir in order to improve the performance when releasing the brake. The outlet valves 222 are connected to the wheel cylinders 40, respectively, to control the hydraulic pressure that escapes from each of the wheels RR, RL, FR and FL. That is, the outlet valves 222 may sense the braking pressure of each of the wheels RR, RL, FR and FL and may be selectively opened to control the pressure when the pressure reduction braking is required.

The outlet valves 222 may be provided as normally closed type solenoid valves that are closed in a normal state and operate to be opened when receiving an open signal from the electronic control unit.

The hydraulic control unit 200 may be connected to the first and second backup passages 251 and 252. For example, the first hydraulic circuit 201 may be connected to the first backup passage 251 to be supplied with the hydraulic pressure from the master cylinder 20, and the second hydraulic circuit 202 may be connected to the second backup passage 252 to be supplied with the hydraulic pressure from the master cylinder 20.

At this time, the first backup passage 251 may join with the first hydraulic circuit 201 upstream of the first and second inlet valves 221a and 221b. Likewise, the second backup passage 252 may join with the second hydraulic circuit 202 upstream of the third and fourth inlet valves 221c and 221d. Accordingly, the hydraulic pressure provided by the hydraulic pressure supply apparatus 100 may be supplied to the wheel cylinders 40 through the first and second hydraulic circuits 201 and 202 when the first and second cut valves 261 and 262 are closed, and the hydraulic pressure provided by the master cylinder 20 may be supplied to the wheel cylinders 40 through the first and second backup passages 251 and 252 when the first and second cut valves 261 and 262 are opened. At this time, since the plurality of inlet valves 221a, 221b, 221c and 221d are in a normally open state, there is no need to switch the operation state.

Reference numeral "PS1", which is not described, is a hydraulic passage pressure sensor that senses the hydraulic pressure of the first and second hydraulic circuits 201 and 202, and reference numeral "PS2" is a backup passage pressure sensor that measures the oil pressure of the master cylinder 20. In addition, reference numeral "MPS" is a motor control sensor that controls the rotation angle or current of the motor 120.

Hereinafter, the operation of the electronic brake system 1 according to an embodiment of the present disclosure will be described in detail.

FIG. 3 is a hydraulic circuit diagram showing a situation in which a hydraulic piston of an electronic brake system according to an embodiment of the present disclosure provides a braking pressure while advancing.

When the braking by a driver is started, the demanded braking amount of the driver may be sensed through the pedal displacement sensor 11 through information such as the pressure of the brake pedal 10 depressed by the driver. The electronic control unit (not shown) receives the electric signal output from the pedal displacement sensor 11 and drives the motor 120.

Further, the electronic control unit may receive the magnitude of the regenerative braking amount through the backup passage pressure sensor PS2 provided at an outlet side of the master cylinder 20 and the hydraulic passage pressure sensor PS1 provided in the second hydraulic circuit 202, and may calculate the magnitude of the friction braking amount in accordance with the difference between the demanded braking amount of the driver and the regenerative braking amount so as to grasp the magnitude of the pressure increase or the pressure decrease of the wheel cylinders 40.

As shown in FIG. 3, when the driver depresses the brake pedal 10 at a beginning of braking, the motor 120 is operated to rotate in one direction and the rotational force of the motor 120 is transmitted to the hydraulic pressure providing unit 110 by the power converting unit 130, and the hydraulic piston 114 of the hydraulic pressure providing unit 110 advances to generate the hydraulic pressure in the first pressure chamber 112. The hydraulic pressure discharged from the hydraulic pressure providing unit 110 is transmitted to the wheel cylinders 40 provided on the four wheels through the first hydraulic circuit 201 and the second hydraulic circuit 202 to generate the braking force.

Specifically, the hydraulic pressure provided in the first pressure chamber 112 is directly transmitted to the wheel cylinders 40 provided on the two wheels FR and RL through the first hydraulic passage 211 and the second hydraulic passage 212 connected to the first communication hole 111a. At this time, the first and second inlet valves 221a and 221b, which are respectively installed on two flow passages branched from the second hydraulic passage 212, are provided in the open state. In addition, the first and second outlet valves 222a and 222b, which are respectively installed on two flow passages branched from the second hydraulic passage 212, are maintained in a closed state to prevent the hydraulic pressure from leaking to the reservoir 30.

Further, the hydraulic pressure provided in the first pressure chamber 112 is directly transmitted to the wheel cylinders 40 provided on the two wheels RR and FL through the first hydraulic passage 211 and the third hydraulic passage 213 connected to the first communication hole 111a. At this time, the third and fourth inlet valves 221c and 221d, which are respectively installed on two flow passages branched from the third hydraulic passage 213, are provided in the open state. In addition, the third and fourth outlet valves 222c and 222d, which are respectively installed on two flow passages branched from the third hydraulic passage 213, are maintained in the closed state to prevent the hydraulic pressure from leaking to the reservoir 30.

At this time, since the third control valve 233 and the fourth control valve 234 provided as check valves are kept closed, the fifth hydraulic fluid passage 215 and the sixth hydraulic fluid passage 216 are blocked. That is, the third control valve 233 prevents the hydraulic pressure generated in the first pressure chamber 112 from being transmitted to the second pressure chamber 113 through the fifth hydraulic passage 215 connected to the second hydraulic passage 212, thereby increasing the rate of pressure increase per stroke. Therefore, a quick braking response may be expected at the beginning of braking. Further, the fourth control valve 234 prevents the hydraulic pressure generated in the first pressure chamber 112 from being transmitted to the second pressure chamber 113 through the sixth hydraulic passage 216 connected to the third hydraulic passage 213, thereby increasing the rate of pressure increase per stroke. Therefore, a quick braking response may be expected at the beginning of braking.

In addition, although not shown in the drawing, if the pressure transmitted to the wheel cylinders 40 is measured to be higher than a target pressure value in accordance with a pedal effort of the brake pedal 10, the electronic control unit may open one or more of the first to fourth outlet valves 222 to control to follow the target pressure value.

Further, when the hydraulic pressure is generated in the hydraulic pressure supply apparatus 100, the first and second cut valves 261 and 262 provided on the first and second backup passages 251 and 252 connected to the first and second hydraulic pressure ports 24a and 24b of the master cylinder 20 are closed so that the hydraulic pressure discharged from the master cylinder 20 is not transmitted to the wheel cylinders 40.

Further, the pressure generated by the pressing of the master cylinder 20 according to the pedal effort of the brake pedal 10 is transmitted to the simulation apparatus 50 connected to the master cylinder 20. At this time, the normally closed simulator valve 54 disposed at a rear end of the simulation chamber 51 is opened so that the oil filled in the simulation chamber 51 is transferred to the reservoir 30 through the simulator valve 54. In addition, the reaction force piston 52 moves so that a pressure corresponding to the load of the reaction force spring 53 supporting the reaction force piston 52 is formed in the simulation chamber 51, thereby providing a proper pedal feeling to the driver.

Further, the hydraulic passage pressure sensor PS1 installed on the first hydraulic passage 211 may detect the flow rate delivered to the wheel cylinder 40 installed on the front left wheel FL or the rear right wheel RR (hereinafter, simply referred to as the wheel cylinder 40). Accordingly, the flow rate delivered to the wheel cylinder 40 may be controlled by controlling the hydraulic pressure supply apparatus 100 in accordance with the output of the hydraulic passage pressure sensor PS1. Specifically, the flow rate discharged from the wheel cylinder 40 and the discharge speed may be controlled by controlling the advancing distance and the advancing speed of the hydraulic piston 114.

Herein, in the above example, the hydraulic pressure piston 114 is advanced to provide the braking pressure, but the present disclosure is not limited thereto.

For example, since the hydraulic pressure providing unit 110 of the electronic brake system 1 according to an embodiment of the present disclosure is provided in a double-acting type, although not shown, the hydraulic pressure piston 114 may provide the braking pressure while reversing. That is, when the brake pedal is depressed, the motor 120 is operated to rotate in the reverse direction and the rotational force of the motor 120 is transmitted to the hydraulic pressure providing unit 110 by the power converting unit 130, and the hydraulic piston 114 of the hydraulic pressure providing unit 110 moves backward to generate the hydraulic pressure in the second pressure chamber 113. The hydraulic pressure discharged from the second pressure chamber 113 of the hydraulic pressure providing unit 110 passes through the fourth hydraulic passage 214 and the fifth hydraulic passage 215, and the fourth hydraulic passage 214 and the sixth hydraulic passage 216, respectively, and is transmitted to the wheel cylinders 40 provided on the four wheels through the first hydraulic circuit 201 and the second hydraulic circuit 202 to generate the braking force.

At this time, since the first control valve 231 and the second control valve 232 provided as check valves are kept closed, the second hydraulic fluid passage 212 and the third hydraulic fluid passage 213 are blocked. That is, the first control valve 231 prevents the hydraulic pressure generated in the second pressure chamber 113 from being transmitted to the first pressure chamber 112 through the second hydraulic passage 212 connected to the fifth hydraulic passage 215, thereby increasing the rate of pressure increase per stroke. Therefore, a quick braking response may be expected at the beginning of braking. Further, the second control valve 232 prevents the hydraulic pressure generated in the second pressure chamber 112 from being transmitted to the first pressure chamber 112 through the third hydraulic passage 213 connected to the sixth hydraulic passage 216, thereby increasing the rate of pressure increase per stroke. Therefore, a quick braking response may be expected at the beginning of braking.

Next, a case of releasing the braking force in the braking state in the normal operation of the electronic brake system 1 according to an embodiment of the present disclosure will be described.

FIG. 4 is a hydraulic circuit diagram showing a situation in which the hydraulic piston 14 releases the braking pressure while reversing.

Referring to FIG. 4, when the pedal effort applied to the brake pedal 10 is released, the motor 120 generates a rotational force in a direction opposite to the braking direction and transmits the rotational force to the power converting unit 130, and the worm shaft 131, the worm wheel 132 and the drive shaft 133 of the power converting unit 130 are rotated in the opposite direction to the braking direction to move the hydraulic piston 114 back to its original position, so that the pressure in the first pressure chamber 112 is released or a negative pressure is generated in the first pressure chamber 112.

However, as described above, since the first control valve 231 and the second control valve 232 provided as check valves are kept closed, even if a negative pressure is generated in the first pressure chamber 112, the hydraulic pressure discharged from the wheel cylinders 30 cannot be transmitted to the first pressure chamber 112. Oil may be supplied to the first pressure chamber 112 in the negative pressure state from the reservoir 30 through the first dump valve 241.

On the Contrary, hydraulic pressure is generated in the second pressure chamber 113 while the hydraulic piston 114 moves backward.

The hydraulic pressure provided in the second pressure chamber 113 is directly transmitted to the wheel cylinders 40 provided on the two wheels FR and RL through the fourth hydraulic passage 214 and the fifth hydraulic passage 215. At this time, the first and second inlet valves 221a and 221b installed in the two flow passages branched from the fifth hydraulic passage 215, respectively, are kept open, and the first and second outlet valves 222a and 222b are provided in the open state, so that the hydraulic pressure in the second pressure chamber 113 is transmitted to the reservoir 30. At this time, the hydraulic pressure in the wheel cylinders 40 is also transmitted and discharged to the reservoir 30 through the first and second outlet valves 222a and 222b in the opened state.

Further, the hydraulic pressure provided in the second pressure chamber 113 is directly transmitted to the wheel cylinders 40 provided on the two wheels RR and FL through the fourth hydraulic passage 214 and the sixth hydraulic passage 216. At this time, the third and fourth inlet valves 221c and 221d installed in the two flow passages branched from the sixth hydraulic passage 216, respectively, are kept open, and the third and fourth outlet valves 222c and 222d are provided in the open state, so that the hydraulic pressure in the second pressure chamber 113 is transmitted to the reservoir 30. At this time, the hydraulic pressure in the wheel cylinders 40 is also transmitted and discharged to the reservoir 30 through the third and fourth outlet valves 222c and 222d in the opened state.

The reason why the hydraulic pressure in the wheel cylinders 40 is discharged through the outlet valves 222 is because the pressure in the reservoir 30 is smaller than the pressure in the wheel cylinders 40. The pressure in the reservoir is usually provided at atmospheric pressure. Since the pressure in the wheel cylinders 40 is usually significantly higher than the atmospheric pressure, the hydraulic pressure in the wheel cylinders 40 is quickly discharged to the reservoir 30 when the outlet valves 222 are opened.

The hydraulic passage pressure sensor PS1 installed on the second hydraulic passage 212 may detect the flow rate discharged from the wheel cylinder installed on the front left wheel FL or the rear right wheel RR. Accordingly, the flow rate discharged from the wheel cylinder 40 may be controlled by controlling the hydraulic pressure supply apparatus 100 in accordance with the output of the hydraulic passage pressure sensor PS1. Specifically, the flow rate discharged from the wheel cylinder 40 and the discharge speed may be controlled by controlling the advancing distance and the advancing speed of the hydraulic piston 114.

Herein, in the above example, the hydraulic pressure piston 114 is advanced to provide the braking pressure, but the present disclosure is not limited thereto.

For example, since the hydraulic pressure providing unit 110 of the electronic brake system 1 according to an embodiment of the present disclosure is provided in a double-acting type, although not shown, the hydraulic pressure piston 114 may release the braking pressure while advancing. That is, when the pedal effect applied to the brake pedal 10 is released, the motor 120 is operated to rotate in the reverse direction and the rotational force of the motor 120 is transmitted to the hydraulic pressure providing unit 110 by the power converting unit 130, and the hydraulic piston 114 of the hydraulic pressure providing unit 110 moves forward to generate the hydraulic pressure in the first pressure chamber 112. The hydraulic pressure discharged from the first pressure chamber 112 of the hydraulic pressure providing unit 110 passes through the first hydraulic passage 211 and the second hydraulic passage 212, and is transmitted to the reservoir 30 through the first and second inlet valves 221a and 221b that are kept opened and the first and second outlet valves 222a and 222b that are provided in the closed state. At this time, the hydraulic pressure in the wheel cylinders 40 is also transmitted to the reservoir 30 through the first and second outlet valves 222a and 222b that are in the open state. Further, the hydraulic pressure discharged from the first pressure chamber 112 of the hydraulic pressure providing unit 110 passes through the first hydraulic passage 211 and the third hydraulic passage 213, and is discharged to the reservoir 30 through the third and fourth inlet valves 221c and 221d that are kept opened and the third and fourth outlet valves 222c and 222d that are provided in the closed state. At this time, the hydraulic pressure in the wheel cylinders 40 is also discharged to the reservoir 30 through the third and fourth outlet valves 222c and 222d in the open state.

FIG. 5 is a hydraulic circuit diagram showing a state in which the electronic brake system 1 according to an embodiment of the present disclosure is actively operated as in the ABS/TCS/ESC, and specifically the hydraulic piston 114 brakes selectively while reversing.

When the motor 120 is operated according to the pedal effect applied to the brake pedal 10, the rotational force of the motor 120 is transmitted to the hydraulic pressure providing unit 110 through the power converting unit 130 to generate a hydraulic pressure. At this time, the first and second cut valves 261 and 262 are closed so that the hydraulic pressure discharged from the master cylinder 20 is not transmitted to the wheel cylinders 40.

More specifically, referring to FIG. 5, the hydraulic piston 114 generates a hydraulic pressure in the second pressure chamber 113 while moving backward, and at this time, the second inlet valve 221b is provided in the open state so that the hydraulic pressure transmitted through the fourth hydraulic passage 214 and the fifth hydraulic passage 215 actuates the wheel cylinder 40 disposed on the rear left wheel RL to generate a braking force.

Likewise, the hydraulic piston 114 generates a hydraulic pressure in the second pressure chamber 113 while moving backward, and at this time, the fourth inlet valve 221d is provided in the open state so that the hydraulic pressure transmitted through the fourth hydraulic passage 214 and the sixth hydraulic passage 216 actuates the wheel cylinder 40 disposed on the front left wheel FL to generate a braking force.

At this time, the first and third inlet valves 221a and 221c is switched to the closed state, and the first to fourth outlet valves 222a to 222d is also maintained in the closed state.

As such, the electronic brake system 1 according to an embodiment of the present disclosure may independently transmit or discharge hydraulic pressure to the wheel cylinders 40 of the wheels RL, RR, FL and FR depending on the required pressure by independently controlling the operation of the motor 120 and the respective valves 54, 221a, 221b, 221c, 221d, 222a, 222b, 222c, 222d, 261 and 262, thereby performing a precise pressure control.

As is apparent from the above, the electronic brake system according to an embodiment of the present disclosure can provide hydraulic pressure more quickly and more precisely control the pressure increase by constituting a hydraulic piston of the hydraulic pressure supply device in a double acting manner.

Further, the electronic brake system according to an embodiment of the present disclosure not only can quickly provide hydraulic pressure to each hydraulic circuit but also effectively maintain the pressure in the hydraulic passage of the hydraulic circuit connected to the pressure chamber which is not compressed when switching the hydraulic piston by constituting the control valves provided on the inlet side of the first and second hydraulic circuits connected to the wheel cylinders as check valves.

Further, the electronic brake system according to an embodiment of the present disclosure can reduce operating noise since the number of valves operated in operation of the system is smaller than in the prior art.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic brake system comprising:
a hydraulic pressure supply apparatus which generates a hydraulic pressure by using a piston operated by an electrical signal output corresponding to a displacement of a brake pedal, and includes a first pressure chamber provided at one side of a piston movably accommodated in a cylinder block to be connected to one or more wheel cylinders and a second pressure chamber provided at the other side of the piston to be connected to one or more wheel cylinders;
a first hydraulic passage communicating with the first pressure chamber;
a second hydraulic passage branched from the first hydraulic passage;
a third hydraulic passage branched from the first hydraulic passage;
a fourth hydraulic passage communicating with the second pressure chamber;
a fifth hydraulic passage branched from the fourth hydraulic passage to join with the second hydraulic passage;
a sixth hydraulic passage branched from the fourth hydraulic passage to join with the third hydraulic passage;
a first control valve provided on the second hydraulic passage to control the flow of oil;
a second control valve provided on the third hydraulic passage to control the flow of oil;
a third control valve provided on the fifth hydraulic passage to control the flow of oil;
a fourth control valve provided on the sixth hydraulic passage to control the flow of oil;
a first hydraulic circuit configured such that the second hydraulic passage or the fifth hydraulic passage is connected to two wheel cylinders, respectively; and
a second hydraulic circuit configured such that the third hydraulic passage or the sixth hydraulic passage is connected to two wheel cylinders, respectively,
wherein the first control valve to the fourth control valve are provided as check valves that allow the flow of oil in the direction from the hydraulic pressure supply apparatus to the wheel cylinders and blocks the flow of oil in the opposite direction.

2. The electronic brake system according to claim 1, wherein the first control valve is installed on the second hydraulic passage between a point where the second hydraulic passage and the third hydraulic passage are branched from the first hydraulic passage and a point where the fifth hydraulic passage joins with the second hydraulic passage.

3. The electronic brake system according to claim 1, wherein the second control valve is installed on the third hydraulic passage between a point where the second hydraulic passage and the third hydraulic passage are branched from the first hydraulic passage and a point where the sixth hydraulic passage joins with the third hydraulic passage.

4. The electronic brake system according to claim 1, wherein the third control valve is installed on the fifth hydraulic passage between a point where the fifth hydraulic passage and the sixth hydraulic passage are branched from the fourth hydraulic passage and a point where the second hydraulic passage joins with the fifth hydraulic passage.

5. The electronic brake system according to claim 1, wherein the fourth control valve is installed on the sixth hydraulic passage between a point where the fifth hydraulic passage and the sixth hydraulic passage are branched from the fourth hydraulic passage and a point where the third hydraulic passage joins with the sixth hydraulic passage.

6. The electronic brake system according to claim 1, further comprising:
a reservoir in which oil is stored;
a first dump passage communicating with the first pressure chamber to be connected to the reservoir;
a second dump passage communicating with the second pressure chamber to be connected to the reservoir;
a first dump valve provided on the first dump passage to control the flow of oil and provided as a check valve for blocking the flow of oil in the opposite direction while allowing the flow of oil in the direction from the reservoir to the first pressure chamber; and
a second dump valve provided on the second dump passage to control the flow of oil and provided as a check valve for blocking the flow of oil in the opposite direction while allowing the flow of oil in the direction from the reservoir to the second pressure chamber.

7. The electronic brake system according to claim 1, wherein the hydraulic pressure supply apparatus further includes:
the cylinder block;
the piston movably accommodated in the cylinder block and moving backward and forward by the rotational force of a motor;
a first communication hole formed at the cylinder block forming the first pressure chamber to communicate with the first hydraulic passage; and
a second communication hole formed at the cylinder block forming the second pressure chamber to communicate with the fourth hydraulic passage.

8. The electronic brake system according to claim 1, wherein when a hydraulic pressure is generated in the first pressure chamber while the piston moves forward, the first control valve and the second control valve transmit the hydraulic pressure in the first pressure chamber to the wheel cylinders, and the third control valve and the fourth control valve block the hydraulic pressure in the first pressure chamber from being transmitted to the wheel cylinders.

9. The electronic brake system according to claim 8, further comprising:
a reservoir in which oil is stored;
a second dump passage communicating with the second pressure chamber to be connected to the reservoir; and
a second dump valve provided on the second dump passage to control the flow of oil and provided as a check valve for blocking the flow of oil in the opposite direction while allowing the flow of oil in the direction from the reservoir to the second pressure chamber.

10. The electronic brake system according to claim 1, wherein when a hydraulic pressure is generated in the second pressure chamber while the piston moves backward, the third control valve and the fourth control valve transmit the hydraulic pressure in the second pressure chamber to the wheel cylinders, and the first control valve and the second control valve block the hydraulic pressure in the second pressure chamber from being transmitted to the wheel cylinders.

11. The electronic brake system according to claim 10, further comprising:
a reservoir in which oil is stored;
a first dump passage communicating with the first pressure chamber to be connected to the reservoir; and
a first dump valve provided on the first dump passage to control the flow of oil and provided as a check valve for blocking the flow of oil in the opposite direction while allowing the flow of oil in the direction from the reservoir to the first pressure chamber.

* * * * *